United States Patent
Mohs et al.

(10) Patent No.: US 7,881,611 B2
(45) Date of Patent: *Feb. 1, 2011

(54) OPTICAL FIBER TRANSMISSION SYSTEM WITH NOISE LOADING

(75) Inventors: Georg H. Mohs, E. Brunswick, NJ (US); Stuart M. Abbott, Marlboro, NJ (US); Franklin W. Kerfoot, III, Red Bank, NJ (US); R. Brian Jander, Freehold, NJ (US); Morten Nissov, Ocean, NJ (US)

(73) Assignee: Tyco Electronics Subsea Communications LLC, Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/405,559

(22) Filed: Mar. 17, 2009

(65) Prior Publication Data

US 2009/0214214 A1  Aug. 27, 2009

Related U.S. Application Data

(62) Division of application No. 10/877,059, filed on Jun. 25, 2004, now Pat. No. 7,526,201.

(51) Int. Cl.
*H04B 10/02* (2006.01)
*H04B 10/08* (2006.01)

(52) U.S. Cl. .............. 398/32; 398/31; 398/33; 398/34; 398/38; 398/94; 398/197

(58) Field of Classification Search ............. 398/25–34, 398/37, 38, 79, 81, 93–95, 147, 158, 160, 398/192–194, 197

See application file for complete search history.

(56) References Cited

U.S. PATENT DOCUMENTS

| H1702 | H | 1/1998 | Esman et al. |
|---|---|---|---|
| 5,708,740 | A | 1/1998 | Cullen |
| 5,754,718 | A | 5/1998 | Duck et al. |
| 5,912,754 | A | 6/1999 | Koga et al. |
| 5,923,797 | A | 7/1999 | Baugh et al. |
| 6,025,941 | A | 2/2000 | Srivastava et al. |

(Continued)

OTHER PUBLICATIONS

Australian Office Action issued in related Australian patent Application No. 2005267180 dated Feb. 5, 2009.

(Continued)

*Primary Examiner*—Dalzid Singh
(74) *Attorney, Agent, or Firm*—Grossman, Tucker, Perreault & Pfleger, PLLC

(57) ABSTRACT

A system and method for loading unutilized channels of a WDM system with noise to improve system performance. A transmitter amplifier may impart noise to unutilized channels by reducing amplifier input or providing feedback of the amplifier output. Noise signals may also be looped back to the transmitter from received signals.

14 Claims, 14 Drawing Sheets

U.S. PATENT DOCUMENTS

| | | |
|---|---|---|
| 6,108,123 A | 8/2000 | Kinoshita |
| 6,256,138 B1 | 7/2001 | Huang |
| 6,400,498 B1 | 6/2002 | Shimomura et al. |
| 6,538,782 B1 * | 3/2003 | Otsuka et al. .................. 398/82 |
| 6,704,511 B1 | 3/2004 | Kerfoot, III et al. |
| 6,724,526 B1 * | 4/2004 | Onaka et al. ............. 359/337.1 |
| 7,054,562 B1 | 5/2006 | Balakrishnan et al. |
| 7,106,969 B1 * | 9/2006 | Lichtman et al. ............... 398/59 |
| 7,526,201 B2 * | 4/2009 | Mohs et al. ................... 398/37 |
| 2006/0227412 A1 * | 10/2006 | Ghiggino et al. ............ 359/337 |

OTHER PUBLICATIONS

International Search Report and Written Opinion dated Nov. 27, 2006 issued in related International Patent Application No. PCT/US05/22502.

* cited by examiner

OPTICAL FIBER TRANSMISSION SYSTEM WITH NOISE LOADING

CROSS-REFERENCE TO RELATED APPLICATIONS

This application is a divisional of U.S. application Ser. No. 10/877,059, filed Jun. 25, 2004, now U.S. Pat. No. 7,526,201, which is hereby incorporated herein in its entirety.

TECHNICAL FIELD

The present invention relates to optical fiber transmission systems, and, in particular, to loading unutilized system channels with noise to improve system performance.

BACKGROUND

To maximize the transmission capacity of an optical fiber transmission system, a single optical fiber may be used to carry multiple optical signals in what is called a wavelength division multiplex system (hereinafter a WDM system). Modern WDM systems have a high traffic capacity, for example, a capacity to carry 64 channels of 10 gigabits per second (hereinafter Gb/s). When an optical link is initially deployed, however, the link may be only partially loaded. Initially, only a few of the total number of potential channels may be used to carry information signals.

When the information signals are transmitted over long distances or between links of optical fiber cable, one or more amplifiers may be provided to compensate for signal attenuation. The amplifiers used in some WDM systems cannot easily be modified, and must be sized initially to support a fully loaded link (e.g., 64 channels, each channel carrying 10 Gb/s). The power per channel must be sufficient to provide an adequate signal to noise ratio in the presence of the amplified spontaneous emission noise from the amplifiers, necessitating a high amplifier total output power for systems with high fully-loaded capacity. The amplifiers are thus configured to provide an optical output signal at a nominal optical power. The nominal output power level is insensitive to the power at the input of the amplifier. As the amplifier input power varies over a wide range, the output power changes very little around this nominal output power level. Thus, when the optical link is fully loaded, each channel is amplified to a substantially equal optical output power. If the initially deployed system uses only a few channels for information, these channels share all of the amplifier output power. As additional channels are added, the optical output power per-channel decreases.

In an optical communication network, the fiber medium is non-linear. This nonlinearity interacts with the dispersion of the fiber, and degrades the network performance. At high optical powers (e.g., more than 10 mW per channel), the optical signal experiences more distortion than at low optical powers (e.g., less than 1.0 mW per channel). Since the amplifiers of the network have a substantially constant output power level, the optical power per-channel at initial deployment may be much higher than the optical power per-channel in a fully loaded optical network. As a result of the initial high per-channel power and the system non-linearities, the network communication performance at initial deployment may be worse than the performance when the network is fully loaded.

Accordingly, there is a need for system and method for improving communication performance of an optical communication system operating with unutilized system channels.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
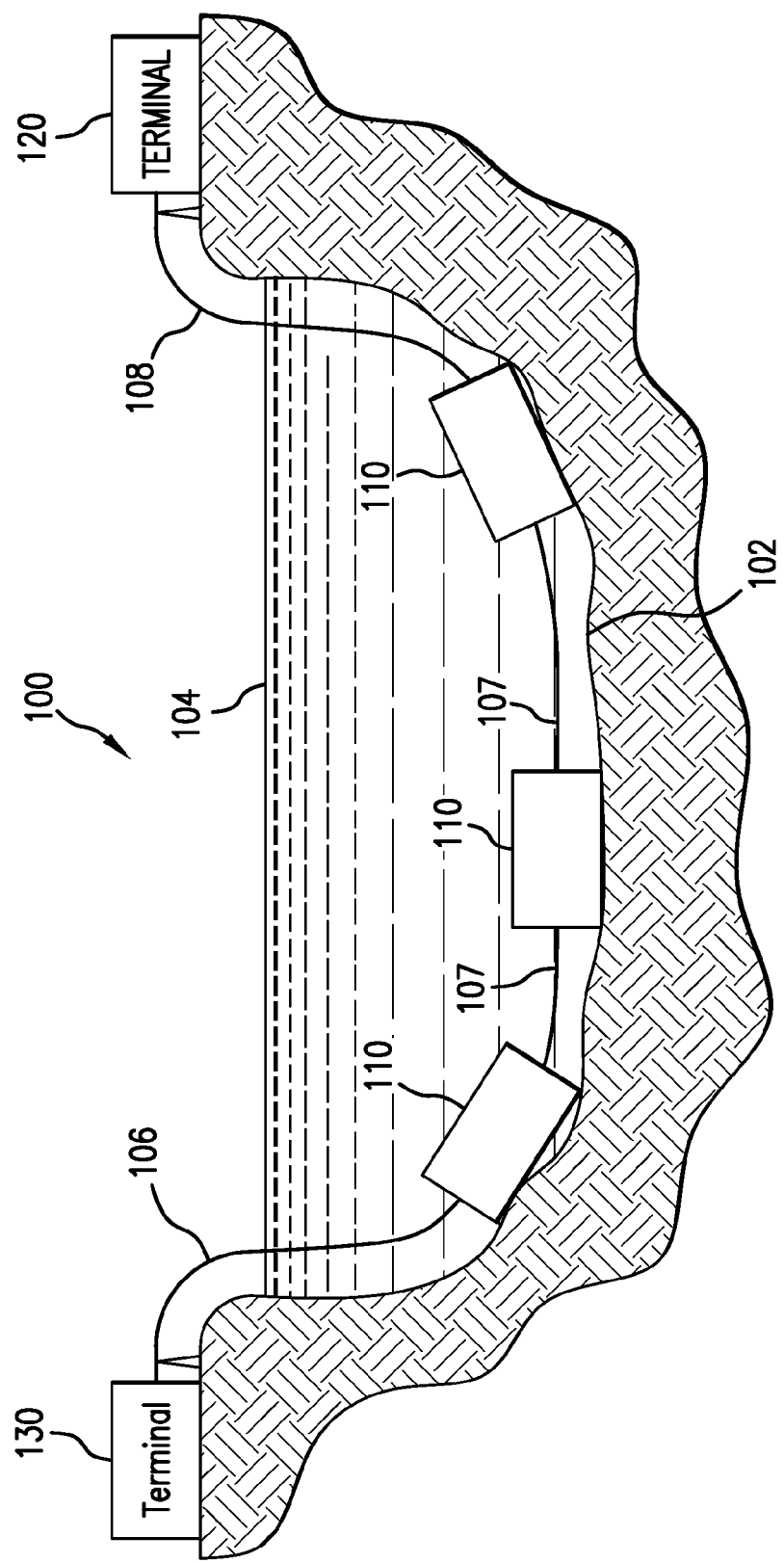
FIG. 1 is a schematic illustration of an optical communication system consistent with the present invention.

Turning now to FIG. 1, there is illustrated an exemplary optical communication system 100 consistent with the present invention. Those skilled in the art will recognize that the system 100 has been depicted as a highly simplified point-to-point system for ease of explanation. The optical communication system 100 includes a terminal 130 coupled to optical cable 106. Optical cable 106 may include a plurality of fiber pairs for carrying optical signals, and may be linked through a plurality of repeaters 110 (including optical amplifiers) and linking optical cables 107 and 108 to terminal 120 to provide a transmission path for bi-directional communication of optical signals between terminal 130 and terminal 120.

System 100 may be employed to span a body of water 104. When used to span a body of water, e.g. an ocean, amplifier 110 may be seated on the ocean floor 102 and the transmission path may span between beach landings. It will be appreciated that a plurality of repeater and optical media links may be disposed beneath water and/or over land.

When a system, e.g. system 100, is configured as a WDM system and initially deployed with unutilized channels, information signals on utilized channels draw all of the power of the fiber amplifiers in repeaters, e.g. repeaters 110. The utilized channels can thus propagate through the system with excessive power-per channel, leading to degradation in the received signal due to system non-linearities. As used herein, "utilized channels" shall refer to WDM system channel locations carrying information signals on the system, and "unutilized channels" shall refer to WDM system channel locations that do not contain information carrying signals.

Generally, systems and methods consistent with the present invention address this issue by loading the system with noise additionally to the initial information channels at the transmitter. The noise may be broadband, i.e. extending across utilized and unutilized channels, or it may be filtered to encompass only unutilized channel positions. In either case, the noise draws a proportionate share of the repeaters' power similar to information signals. As such, many or all WDM channels appear to be loaded from initial operation.

Figure 2:
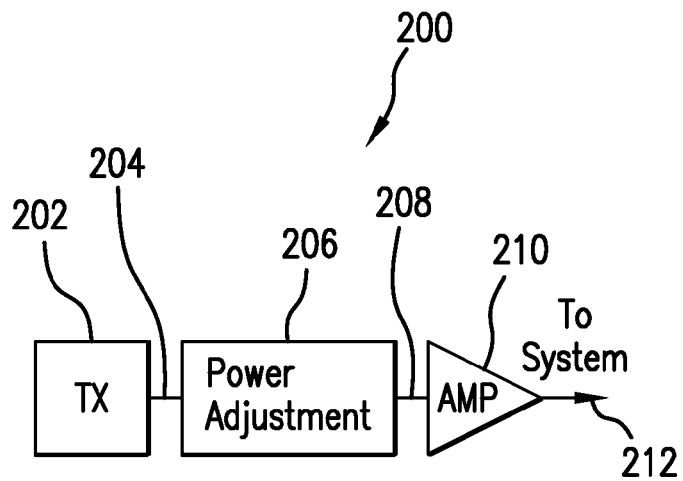
FIG. 2 is a schematic illustration of the transmitter of an exemplary system consistent with the invention.

FIG. 2 schematically illustrates one exemplary embodiment of a system 200 consistent with the invention. In the illustrated exemplary embodiment, the system 200 includes a signal source 202 configured for transmitting a WDM signal 204 to a power level adjustment device 206, such as one or more variable optical attenuators (VOAs). The power adjustment device 206 may be set to provide a desired attenuation across the bandwidth of the WDM signal 204 and provide an attenuated WDM output signal 208 as an input to an optical amplifier 210, e.g. a constant output power erbium doped fiber amplifier (EDFA). The optical amplifier may be configured to amplify the signal 208 for transmission on the optically amplified transmission path.

As will be recognized by those of ordinary skill in the art, the amplifier 210 provides a noise output dependent upon the level of input power. The noise output of the amplifier 210 increases across the amplifier bandwidth as the input power level decreases, since the amplifier is designed to provide constant total output power and thus the amplifier gain increases as the input power decreases. The illustrated embodiment 200 uses this feature to establish an output signal 212 to the first repeater including the information bearing WDM signals and a noise spectrum extending across the system bandwidth.

Figure 3A:
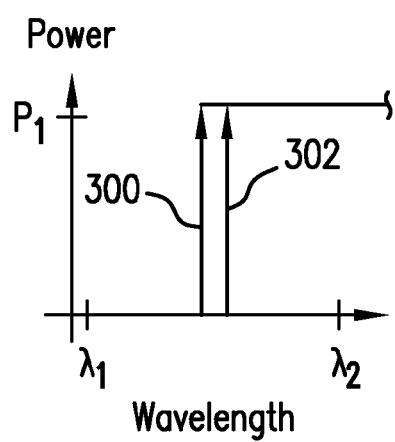
FIGS. 3A-B are exemplary power vs. wavelength plots illustrating operation of an exemplary system consistent with FIG. 2.
Figure 3B:
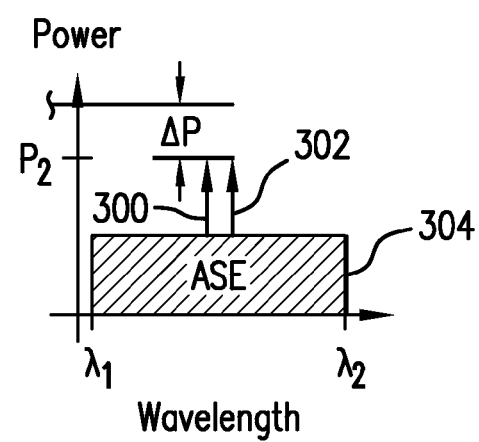

Operation of the exemplary embodiment 200 is illustrated in FIGS. 3A and 3B. FIGS. 3A and 3B illustrate a WDM system having a bandwidth extending from $\lambda_1$ to $\lambda_2$ and including only two utilized channels carrying information signals 300, 302. As shown in FIG. 3A, the two utilized channels 300, 302 may be launched by each repeater in the optically amplified transmission path at an initial power level $P_1$, which may be too high to achieve reliable data transmission due to system non-linearities. Noise may be added across the system bandwidth by reducing the power of the utilized channels via the power adjustment device 206 into the amplifier 210 such that the launched power per channel for both utilized channels at each repeater is reduced to a power $P_2$.

As shown in FIG. 3B, when the power in the utilized channels is sufficiently reduced and provided at the input to the amplifier, the amplifier provides an output including the channels 300, 302 and an amplified spontaneous emission (ASE) noise spectrum 304 extending across the system bandwidth. The amplifier output may be coupled to the optically amplified path of the transmission system as a transmitted WDM signal. The noise in the output spectrum occupies unutilized channels so that the repeater power may be shared across both the utilized and unutilized channels in the system.

Figure 4:
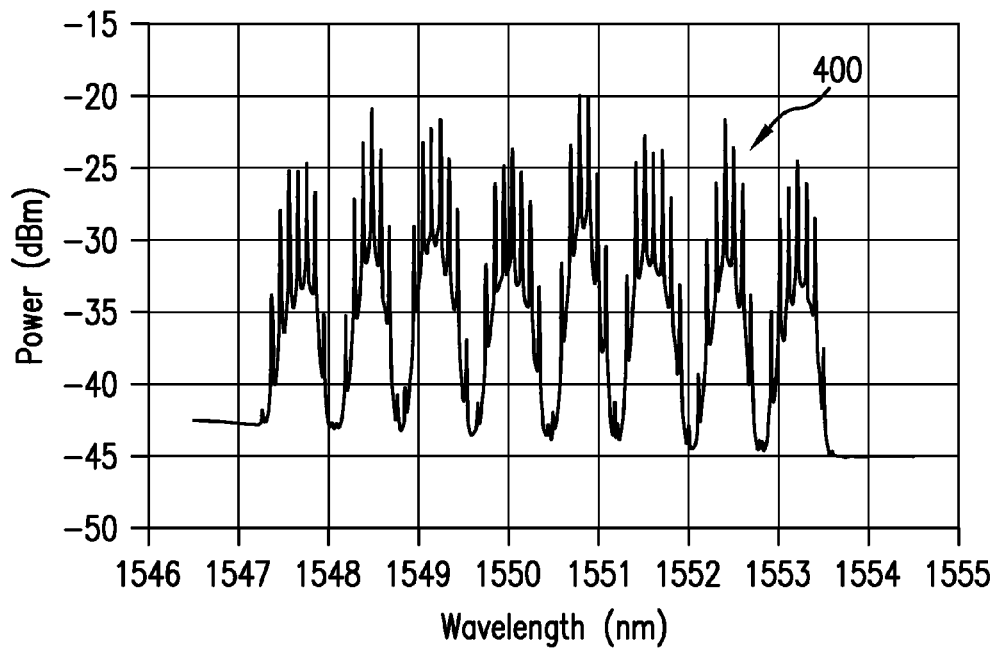
FIG. 4 is a plot of power vs. wavelength illustrating an exemplary transmitted spectrum for a transmission experiment using a system consistent with FIG. 2.
Figure 5:
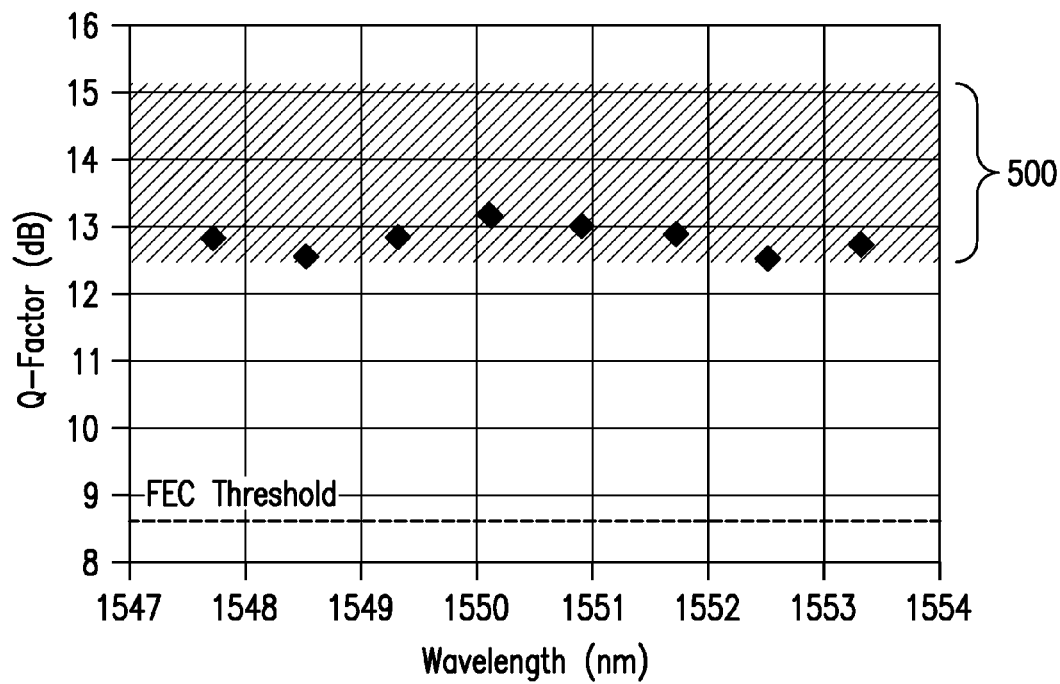
FIG. 5 is a plot of Q-factor vs. wavelength for a received signal associated with the transmitted spectrum of FIG. 4.

FIGS. 4 and 5 illustrate the results of a transmission experiment conducted using an exemplary system consistent with the configuration of FIG. 2. The experiment was conducted on a system having a span of about 6653 km and a full-capacity design of 64 10-Gb/s channels in a 27 nm system bandwidth. Eight (8) channels were propagated at 100 Ghz spacing in the center of the band. The power in each of the eight channels was iteratively attenuated to achieve an optimum balance of channel power and amplifier generated noise. The resulting transmitted channel power spectrum 400 is illustrated in FIG. 4.

FIG. 5 is a plot of Q-factor vs. wavelength showing the performance for all eight channels. The shaded band 500 in FIG. 5 represents the desired performance for the fully-loaded (all channels utilized) system. As shown, the Q-factor performance of the 8 channels transmitted using a configuration consistent with FIG. 2 was within the expected performance band for the fully loaded system.

Those of ordinary skill in the art will recognize that the optimum attenuation level set by the power adjustment device 206 depends on system characteristics and may be iteratively determined, or may be established by monitoring the received signal and providing a correction signal via feedback loop. In addition, the attenuation level may be modified upon addition or subtraction of channels to the system, and may be set to zero when the system is fully loaded. Of course, as the attenuation level increases, the amplifier generated noise increases, resulting in a reduction in the transmitted optical signal-to-noise ratio (OSNR).

Figure 6:
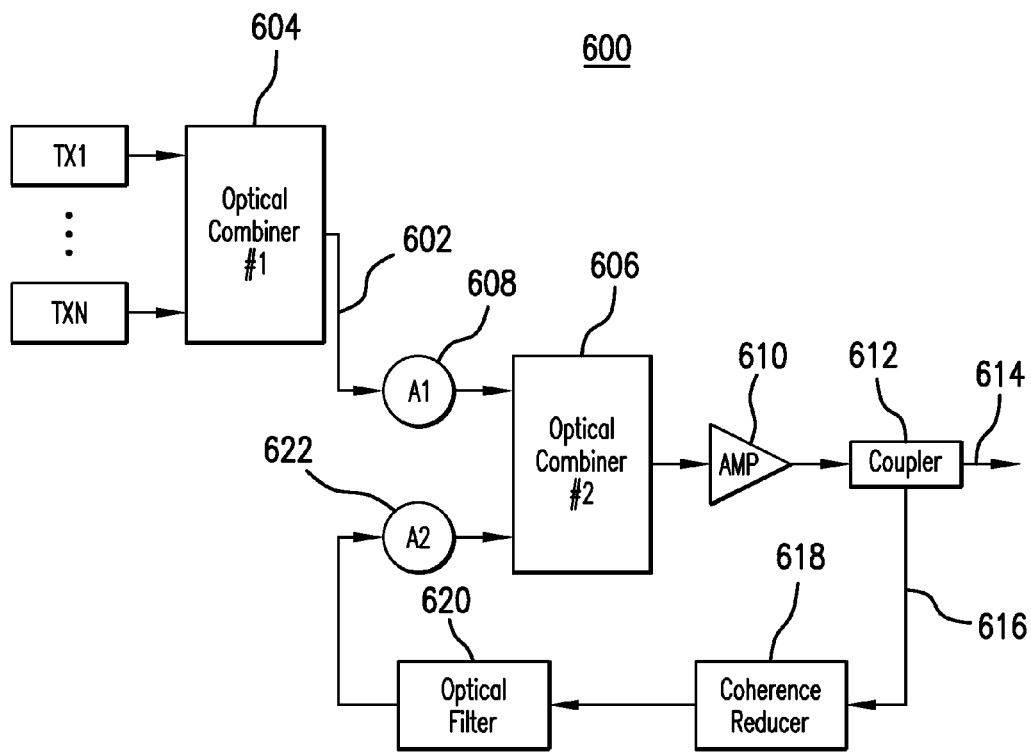
FIG. 6 is a schematic illustration of the transmitter of another exemplary system consistent with the present invention.

FIG. 6 schematically illustrates another exemplary embodiment 600 of a WDM system consistent with the invention. In the illustrated exemplary system 600, optical power per-channel in a WDM system is managed using a controlled level of wavelength-selective optical feedback to provide loading noise for unutilized channels at wavelengths away from the data channels. As shown, one or more data transmitters TX1 . . . TXN provide information signals on wavelengths associated with separate channels of the WDM system. The signals may be combined into a WDM signal 602 by an optical combiner 604 and provided at an input to a second combiner 606. Those of ordinary skill in the art will recognize that an optical combiner may take a variety of configurations, and may include passive and/or active devices configured to combine portions of each input into a common output. An attenuator 608 may be provided in the path between optical combiner 604 and optical combiner 606 to adjust the power level of the information signals in WDM signal 602.

The output of the optical combiner 606 may be coupled to the input of an optical amplifier 610, e.g. a constant output erbium doped fiber amplifier (EDFA). The output of the amplifier 610 may be coupled to the optically amplified path 614 of the transmission system as the transmitted WDM signal. Those of ordinary skill in the art will recognize that the transmitted WDM signal will include the information signals and noise generated by the amplifier across the system bandwidth.

In the illustrated embodiment, an optical coupler 612 is provided at the output of the amplifier 610. Those of ordinary skill in the art will recognize that an optical coupler provides means for splitting the output of the optical amplifier into two signals with the same or different spectra, and may take a variety of configurations well-known in the art. One output of the coupler may be provided as the transmitted WDM signal 614, and the other output may be provided as a feedback signal on a wavelength selective feedback path 616.

The feedback path may include a coherence reducer 618, e.g. a spool of optical fiber, for reducing the optical coherence between the input to the optical amplifier 610 and the feedback portion of the optical amplifier output. To avoid lasing action in the feedback path 616, the coherence reducer 618 may be configured such that the coherence length is much shorter than the roundtrip distance in the feedback loop.

The feedback path 616 may also include a filter 620 or group of filters for shaping the spectrum of the feedback signal to filter out the portion of the spectrum including the data signals. The output of the filter 620 thus includes the noise generated by the amplifier 610 across the system bandwidth with the locations of the data signals filtered out. Although in the illustrated embodiment the feedback path is first coupled to the coherence reducer 616 and then to the filter 620, those of ordinary skill in the art will recognize that the order of these elements may be reversed.

Figure 7A:
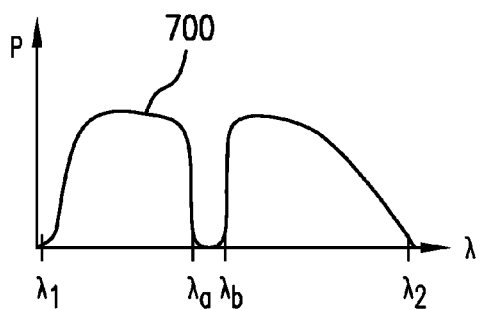
FIGS. 7A-B are exemplary power vs. wavelength plots illustrating operation of an exemplary system consistent with FIG. 6.

FIG. 7A illustrates a simple exemplary spectrum 700 for the output of the filter 620, wherein the system bandwidth extends from $\lambda_1$ to $\lambda_2$, and a single data channel is transmitted between $\lambda_a$ and $\lambda_b$. In a single channel embodiment, as shown, the filter 620 may be configured as a simple notch filter, which passes all signals outside of a stop band including the transmitted information signal. Other filter configurations for filtering multiple utilized channels will be apparent to those skilled in the art.

Figure 7B:
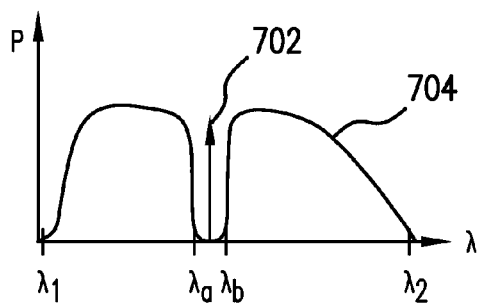

The output of the filter 620 may be attenuated by attenuator 622 and provided as an input to combiner 606. The output spectrum of combiner 606 thus includes the data signals and a copy of the amplifier output signal with the data signals filtered. This signal is amplified and provided as the amplifier output. FIG. 7B illustrates an exemplary output spectrum associated with the system depicted in FIG. 6. As shown, the output signal includes the information signal 702, and the filtered noise loading spectrum derived from the feedback loop. The magnitude of the noise loading may be determined by the characteristics of the amplifier 610, the settings for the attenuators 608, 622, and the characteristics of the filter 620.

Figure 8:
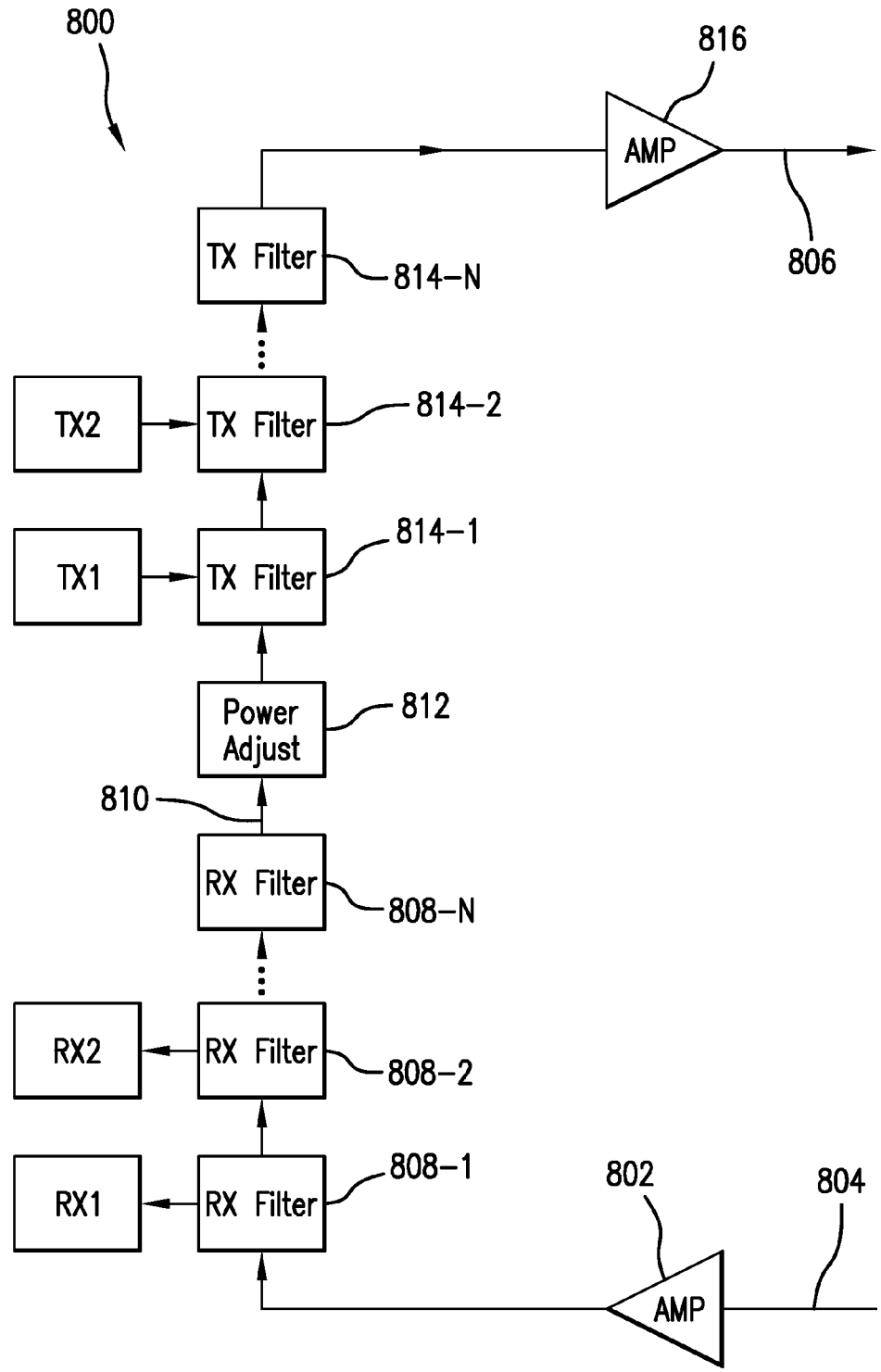
FIG. 8 is a schematic illustration of another exemplary system consistent with the present invention.
Figure 9A:
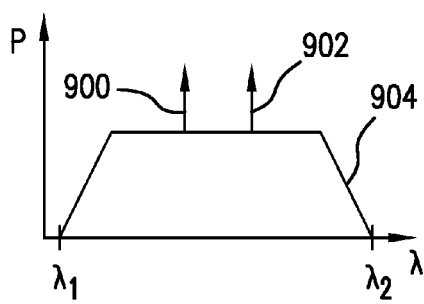
FIGS. 9A-C are exemplary power vs. wavelength plots illustrating operation of an exemplary system consistent with FIG. 8.

Turning now to FIG. 8, there is illustrated another exemplary embodiment 800 of a system consistent with the invention. In the illustrated embodiment, the receive direction of an optical transmission line pair is used as a noise source for loading unutilized bandwidth in the transmitted signals. As shown, a receiver amplifier 802 may receive a signal on a first fiber 804 of a transmit 806 and receive 804 fiber pair of the optical transmission line. FIG. 9A diagrammatically illustrates an initial exemplary power vs. wavelength spectrum for the output of the amplifier 802 in a system including only two utilized channels carrying associated information signals 900, 902. As shown, the spectrum at the output of the amplifier includes the information signals 900, 902 along with a noise spectrum 904 extending across the system bandwidth, i.e. from $\lambda_1$ to $\lambda_2$.

The output of the amplifier 802 may be coupled to the receiver filter structure, which may include a series of three-port filters 808-1, 808-2 . . . 808-N, including one or more filters 801-1, 808-2 configured to drop the information signals to associated receiver terminals, e.g. RX1, RX2, for processing. The number of filters N may be equivalent to the number of information channels transmitted or received. Each channel may have an associated filter on the transmit side and one filter on the receive side.

Figure 9B:
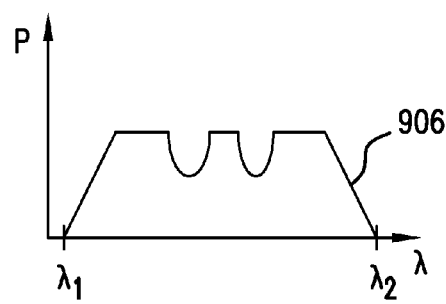

FIG. 9B illustrates an exemplary power vs. wavelength spectrum for the received signal after the two data channels are dropped. As shown, the noise spectrum 906 at the locations of the data channels has been filtered by the receiver filters 808-1, 808-2 . . . 808-N.

The signal may be passed through the entirety of the filter structure, e.g. filters 808-1, 808-2 . . . 808-N, of the receiver terminal to remove substantially all the noise from the locations of the utilized channels. The filtered noise signal may then be looped back to the transmitter in a noise loading loop back path 810 and passed through a power adjustment mechanism 812 and the existing transmitter filter structure. The power adjustment may be configured, for example, as a VOA or a dynamic equalizer. In an embodiment where additional power is required in the filtered noise signal, the power adjustment device may be configured as an optical amplifier for amplifying the filtered noise signal.

The transmitter filter structure may also include a series of three-port optical filters 814-1, 814-2 . . . 814-N and data channel transmitters, e.g. TX1, TX2, for adding information signals on the utilized channels. The noise spectrum from the receiver and the information signals added by the data channel transmitters may be passed through the full filter structure of the transmitter and then to a transmitter amplifier 816. The amplifier 816 may amplify the information signals from the transmitter and the noise spectrum from the receiver and may add additional noise depending on the input power level to the amplifier.

Figure 9C:
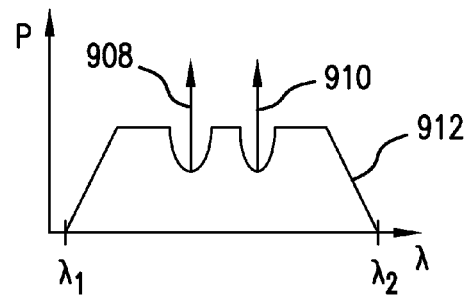

FIG. 9C illustrates an exemplary power vs. wavelength spectrum for the output of the transmit amplifier 816. As shown, the output of the amplifier 816 includes the information signals 908, 910 on the utilized channels at a high OSNR, along with a noise spectrum 912 extending across the system bandwidth for loading the unutilized bandwidth with noise. The output of the amplifier 816 may be provided on the optically amplified transmit fiber 806 of the transmit and receive fiber pair.

Figure 8A:
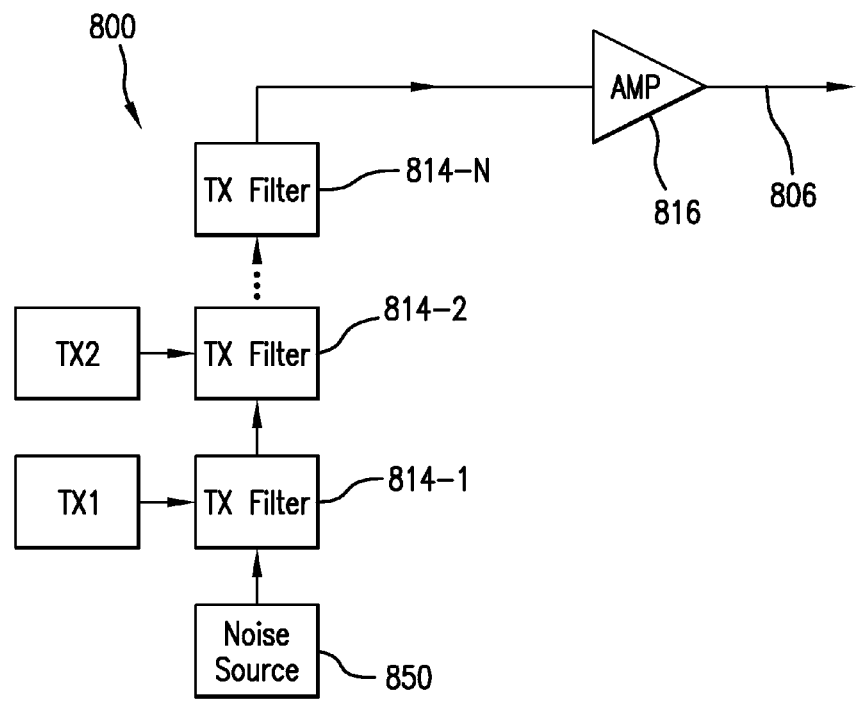
FIG. 8A is a schematic illustration of another exemplary system consistent with the present invention.

The embodiment illustrated in FIG. 8 provides noise loading in a system wherein channel separation is achieved using three-port optical filters. In the illustrated embodiment, the receive direction of an optical transmission line pair is used as a noise source for loading unutilized bandwidth. Other noise sources may be used. FIG. 8A, for example, illustrates a configuration similar to that shown in FIG. 8, except that the noise source is a separate broadband noise source 850, e.g. an optical amplifier. The output of the broadband noise source 850 may be passed through the full transmitter filter structure to load unutilized bandwidth with noise.

Figure 10:
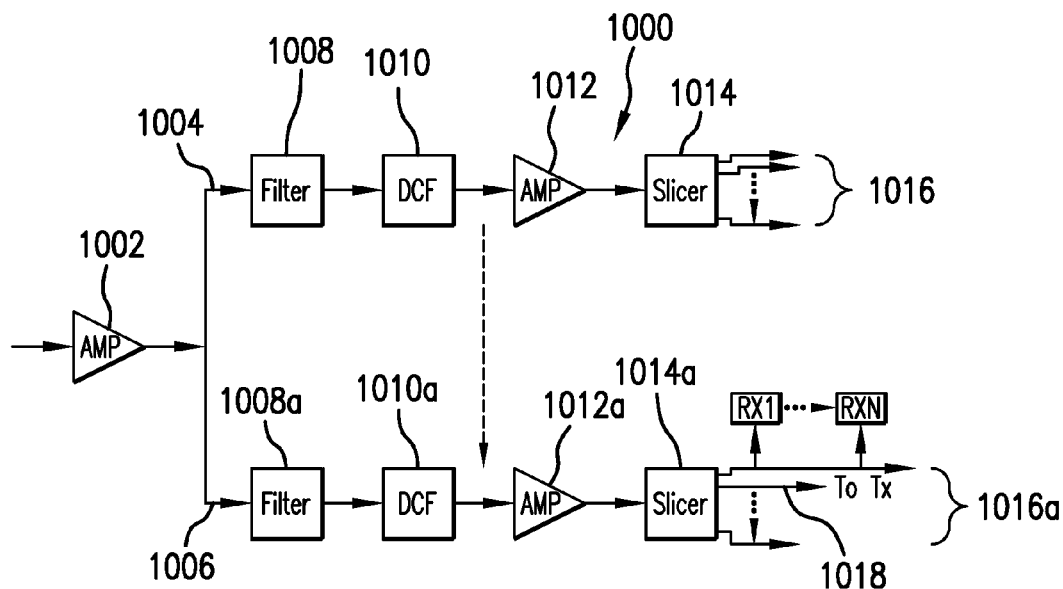
FIG. 10 is a schematic illustration of an exemplary receiver consistent with the present invention.
Figure 11:
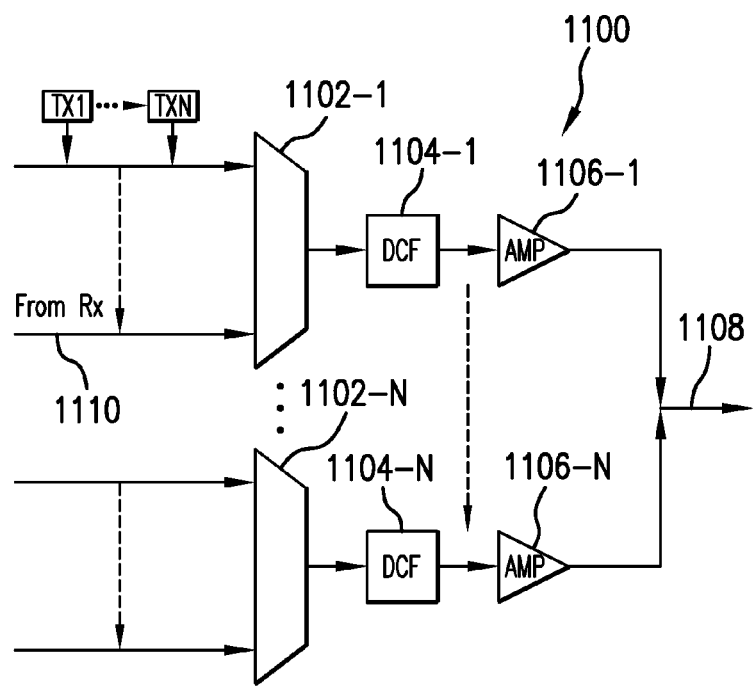
FIG. 11 is a schematic illustration of an exemplary transmitter consistent with the present invention.

FIGS. 10 and 11 illustrate exemplary receiver 1000 and transmitter 1100 configurations consistent with the invention wherein the received signal is used as a noise source and channel separation is accomplished using optical interleaving filters. As used herein, the term "optical interleaving filter" refers to any configuration of one or more optical filter elements for filtering an input optical signal into one or more outputs including a plurality of discrete spectral bands. A variety of optical interleaving filter configurations are known to those of ordinary skill in the art. For example, wideband single component optical interleaving filter configurations for providing one or more outputs at common WDM channel separations are known and commercially available. Those of ordinary skill in the art will also recognize that an optical interleaving filter may be constructed from a stack of discrete filter elements.

The exemplary receiver configuration 1000 illustrated in FIG. 10 includes a receiver amplifier 1002 having an output coupled on a plurality of channel separation paths, e.g. 1004, 1006, using for instance a power splitter (not shown). Each of the illustrated channel separation paths may include an optical filter 1008, 1008a, dispersion compensating fiber 1010, 1010a, an optical amplifier 1012, 1012a, and an optical interleaving filter 1014, 1014a. The optical interleaving filter 1014, 1014a may be configured to filter the received spectrum to provide separate outputs 1016, 1016a with signals appearing at a specified channel spacing, e.g. 50 GHz, 66 GHz, etc. The received information signals on the utilized channels may be dropped from the filter 1014a and coupled to associated receiver terminals RX1 . . . RXN for processing. One or more outputs which may be associated with an unused channel location, e.g. output 1018, may be provided as an input to the transmitter and may include noise signals extending across the system bandwidth and separated by the channel spacing established by the optical interleaving filter.

The exemplary transmitter 1100 illustrated in FIG. 11 may include a plurality of optical combiners 1102-1 . . . 1102-N, e.g. in a cascaded configuration, for combining information signals from data channel transmitters, e.g. TX1 . . . TXN, into channel sub-grouping. The sub-groupings provided at the output of each combiner may be coupled to a DCF 1104-1 . . . 1104-N and an amplifier 1106-1 . . . 1106-N and combined with other sub-groupings to provide a WDM output signal 1108 for transmission on the optically amplified transmission line. As shown, the filter output from the receiver, e.g. output 1018 in FIG. 10, may be provided as an input 1110 to one of the combiners for combining into the WDM signal.

As a result, the spectrum of the WDM output signal 1108 includes noise from the receiver separated by the receiver filter configuration, along with information signals on the utilized channels. Since the noise signals are separated at an integer multiple of the system channel spacing, the unutilized channels are loaded with noise signals having a bandwidth consistent with the channel bandwidth and no noise is added from the receiver to the utilized channels. This provides noise loading of the unutilized channels while maintaining a high OSNR for the information signals on the utilized channels.

Figure 12:
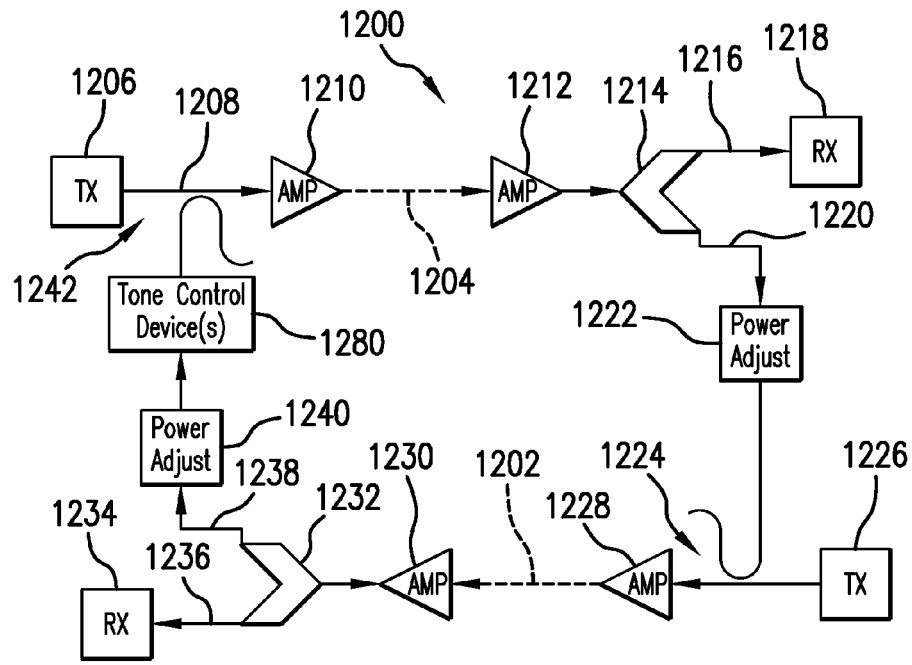
FIG. 12 is a schematic illustration of another exemplary system consistent with the present invention.

Turning now to FIG. 12, there is illustrated another exemplary embodiment 1200 of a system consistent with the present invention using the received signal on a receive fiber of transmit and receive fiber pair as a noise source for loading unutilized channels of a transmitted signal. In the illustrated exemplary embodiment, a transmitter 1206 is provided for generating a WDM signal 1208 including information signals on utilized channels. The WDM signal is coupled to a transmitter amplifier 1210 and transmitted on a first optically amplified transmission path 1204, e.g. a first fiber of a transmission line fiber pair. The transmitted signal is received at a receiver amplifier 1212. The output of the receiver amplifier 1212 may be coupled to the input of an optical interleaving filter 1214, which provides an output 1216 to a receiver terminal 1218 for dropping the received information signals on the utilized channels.

Another output of the filter may be looped back to a second optically amplified transmission path 1202, e.g. a second fiber of a transmission line fiber pair associated with the opposite direction of transmission, for loading some of the unutilized channels on the second path with noise signals. As shown, the noise loading output 1220 of the optical interleaving filter 1214 may be provided on a noise loading loop back path including a power adjustment device 1222, such as a VOA or a dynamic gain equalizer. An optical coupler 1224 may couple the output of the power adjustment device 1222 to a path carrying a WDM signal generated by transmitter 1226 and including utilized and unutilized channels.

The filter 1214 may be configured to provide a noise spectrum for combining with the WDM signal from transmitter 1226 such that the noise is coupled to the WDM signal with noise added on the unutilized channels of the WDM signal, but not on the utilized channels. The combined noise and WDM signal is provided as an input to a transmitter amplifier 1228. The output of the amplifier 1228 may be transmitted on the second optically amplified transmission path 1202 to a receiver amplifier 1230. The output of the receiver amplifier 1230 may be coupled to the input of an optical interleaving filter 1232, which provides an output 1236 to a receiver terminal 1234 for dropping the received information signals on the utilized channels.

Another output of the optical interleaving filter 1232 may be looped back to the first optically amplified transmission path 1204 for loading the unutilized channels on the first path with noise signals. As shown, the noise loading output of the optical interleaving filter may be provided on a noise loading loop back path 1238 including a power adjustment device 1240. The power adjustment device may be configured as a VOA or a dynamic gain equalizer for imparting attenuation across the bandwidth of the noise tones. The power adjustment device may also, or alternatively, be configured as a loss filter for controlling the power level of one or more specific noise tones or bands of noise tones. For example, the power adjustment device may be configured as a pair of arrayed waveguide gratings (AWGs). One AWG may physically separate the noise tones onto different paths coupled to associated attenuators for controlling the loop gain shape by specifically attenuating the tone on each path. The other AWG may combine the attenuated noise tones back onto a common path. The loop back path may also, or alternatively, include other tone control device(s) 1280, e.g. spectral filters, amplifiers, etc., or combinations thereof, for controlling characteristics of the noise tones. For example, the tone control device(s) 1280 may include one or more drop or passband filters, e.g. a high finesse Fabry-Perot filter, to limit broadening of the noise tones during transmission.

In the illustrated exemplary embodiment, an optical coupler 1242 couples the output of the tone control device(s) 1280 to a path carrying the WDM signal 1208 generated by transmitter 1206 and including utilized and unutilized channels. The optical interleaving filter 1232 may be configured to provide a noise spectrum for combining with the WDM signal from transmitter 1206 such that the noise is coupled to the WDM signal with noise added on the unutilized channels of the WDM signal, but not on the utilized channels.

Unutilized channels in both directions of transmission on a transmission line may thus be loaded with noise signals from separate received signals while avoiding the addition of noise on utilized channels. This maintains a high OSNR for the information signals on utilized channels. In addition, separate noise signal allocation for both transmission directions may decouple the noise propagation, thereby suppressing instability in the system. The power adjustment devices 1222, 1240 in each noise loading loop back path may be adjusted to attenuate the noise extracted from the received signal to maintain an appropriate per-channel power level during transmission through the optically amplified paths 1202 and 1204. The level of attenuation imparted the by power adjustment devices may depend on system characteristics including the amplifier configurations, and the optical interleaving filter configurations.

In some embodiments consistent with the present invention, noise circulating through the noise loading loop back paths may pass through a particular wavelength selective device many times. This may result in a decreased bandwidth of the noise tones due to passband narrowing. To mitigate this effect, the filters in the noise loading loop back paths, i.e. optical interleaving filters 1214 and 1234, may be configured with a flat passband characteristic.

Figure 13:
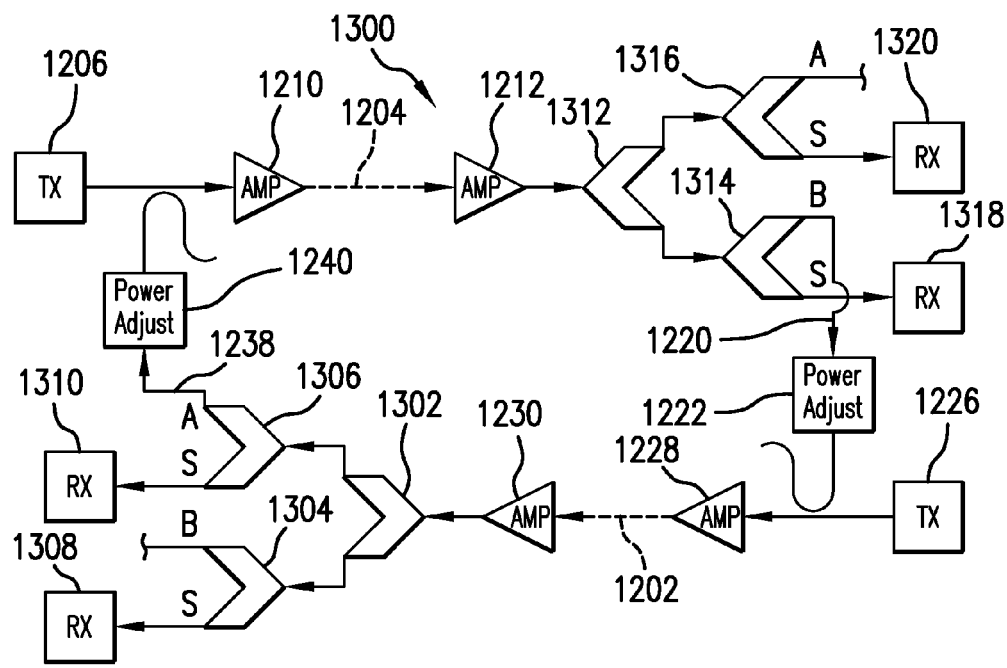
FIG. 13 is a schematic illustration of another exemplary system consistent with the present invention including another alternative loop back path configuration.

FIG. 13 illustrates an exemplary alternative embodiment 1300 of a system consistent with the invention wherein the loading noise propagation in the two transmission directions is decoupled. As shown, decoupling of the noise between the paths may be accomplished using a multi-stage optical interleaving filter configuration at the receive end on either side of the system. In the illustrated exemplary embodiment, the output of the receiver amplifier 1230 may be coupled to a first optical interleaving filter 1302 having outputs provided as inputs to second 1304 and third 1306 optical interleaving filters. Signal outputs S of the second and third optical interleaving filters may be coupled to receiver terminals 1308, 1310, respectively, for dropping the information signals on the utilized channels. The output A of optical interleaving filter 1306 and the output B of optical interleaving filter 1304 may carry noise tones at different spectral locations. In the illustrated embodiment, the output B of the optical interleaving filter 1304 may be terminated, and noise loading tones from output A of the optical interleaving filter 1306 may be provided on the noise loading loopback path 1238 for loading unutilized channels on the transmission path with noise, e.g. in the manner described above.

A similar configuration may be provided on the other side of the transmission path using optical interleaving filters 1312, 1314, and 1316. The optical interleaving filters 1312, 1314 and 1316 may essentially be duplicates of optical interleaving filters 1302, 1304 and 1306, respectively, such that the noise tones at output A of optical interleaving filter 1316 are essentially at the same locations as the noise tones at output A of optical interleaving filter 1306, and noise tones at output B of optical interleaving filter 1314 are essentially at the same locations as the noise tones at output B of optical interleaving filter 1304. As shown, the output of the amplifier 1212 may be coupled to optical interleaving filter 1312 having outputs provided as inputs to optical interleaving filters 1314 and 1316. The signal outputs S of optical interleaving filters 1314 and 1316 may be coupled to receiver terminals 1318, 1320, respectively, for dropping the information signals on the utilized channels. At this side of the transmission system, the output A of the optical interleaving filter 1316 may be terminated, and the output B of optical interleaving filter 1314 may be a noise loading output provided on the noise loading loop back path 1220 for loading unutilized channels on the path with noise.

In this configuration a total of two optical interleaving filter ports per station, i.e. port A of optical interleaving filter 1306 or 1316 and port B of optical interleaving filter 1304 or 1314 are not used for carrying signals. These ports are potential ports for noise loading. Only one port is needed to accomplish sufficient noise loading at each station such that the stations at either end of the amplified optical path can use different optical interleaving filter ports for the noise loading. This decouples the noise tones in the two transmission directions. In a system incorporating a single stage optical interleaving filter configuration, an additional optical interleaving filter for each direction of transmission may be added, e.g. in the noise loading loop back path, to provide a multi-stage configuration for decoupling the circulating noise.

To avoid the effect of passband narrowing for the circulating noise tones, the optical interleaving filter 1306 may be configured with a center frequency slightly offset from the center frequency of the optical interleaving filter 1302. Also, those skilled in the art will recognize that the center frequency of an optical interleaving filter passband is often temperature-dependent. A variation in temperature can lead to a dither of the center frequency of the optical interleaving filter passbands. Thus, system instability may be suppressed in a manner consistent with the invention by providing a temperature-dependent filter, e.g. optical interleaving filter 1306, to separate receiver noise on a noise loading loop back and modulating the temperature to dither the filter center frequency. Those of ordinary skill in the art will recognize a variety of configurations for applying temperature modulation to an optical interleaving filter.

Figure 13A:
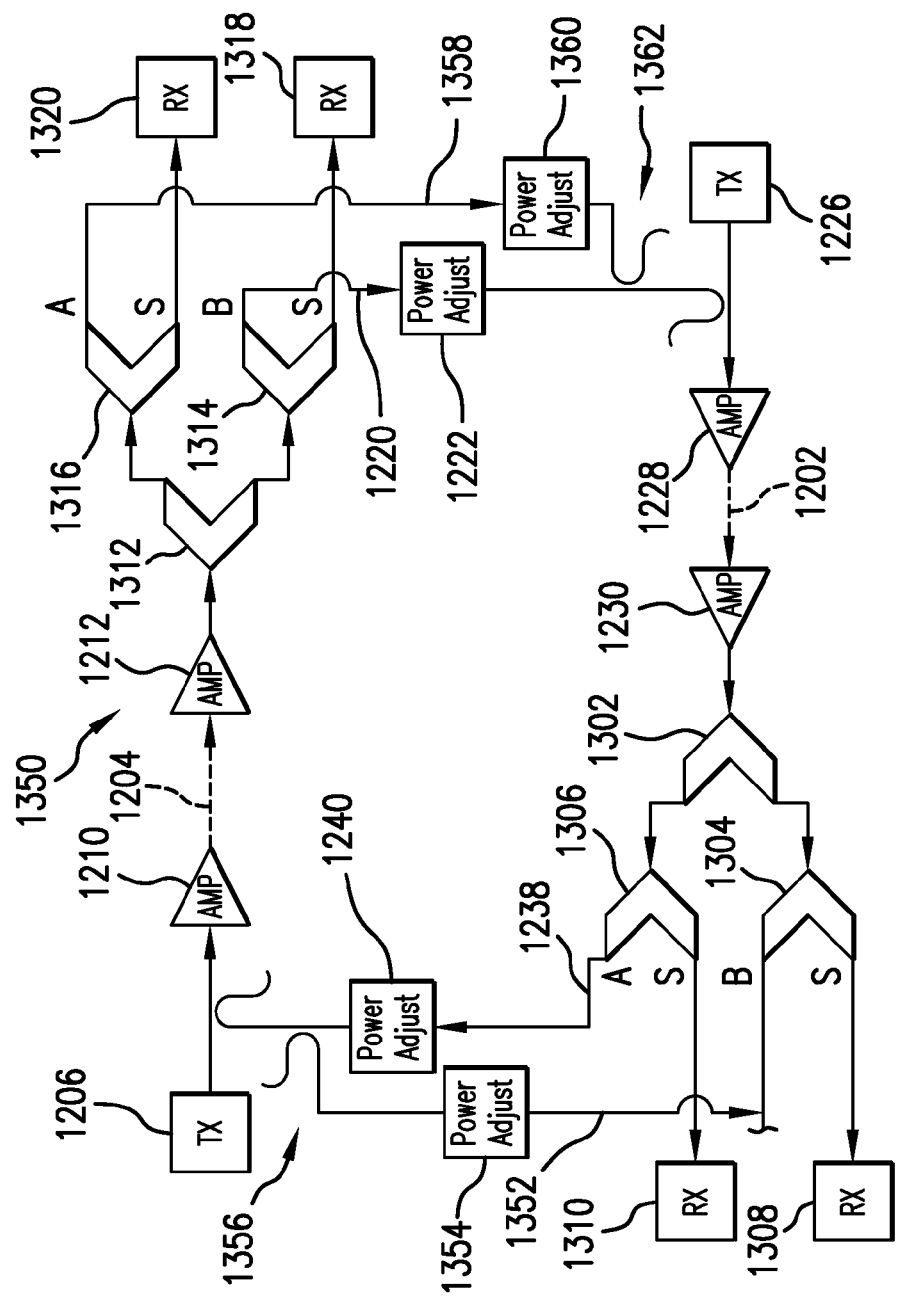
FIG. 13A is a schematic illustration of another exemplary system consistent with the present invention including another alternative loop back path configuration.

FIG. 13A illustrates another exemplary embodiment of a system consistent with the invention. In the illustrated exemplary embodiment, noise tones at the optical interleaving filter outputs A, B are not terminated on opposite sides of the path, but are looped back to the transmitter. As shown, the noise tones from output B of optical interleaving filter 1304 are provided on a noise loading loop back path 1352 including a power adjustment device 1354. Loop back path 1352 may be a relatively high loss path, e.g. by setting power adjustment device 1354 to a high attenuation level, compared to loop back path 1238. An optical coupler 1356 may couple the output of the power adjustment device 1354 to the noise loading loop back path 1238.

On the opposite side of the transmission path, the noise tones from output A of optical interleaving filter 1316 are provided on a noise loading loop back path 1358 including a power adjustment device 1360. Loop back path 1358 may be a relatively high loss path, e.g. by setting power adjustment device 1360 to a high attenuation level, compared to loop back path 1220. An optical coupler 1362 may couple the output of the power adjustment device 1360 to the noise loading loop back path 1220.

In this configuration, a different set of noise tones at each side of the transmission path may carry a higher optical power. For example, in the transmission direction from transmitter 1206 to receivers 1320 and 1318, the majority of optical noise power may be carried by the tones from the output A of optical interleaving filter 1306, whereas in the opposite direction the majority of optical noise power may be carried by the tones from the output B of optical interleaving filter 1314. The maximum allowable ratio of optical powers in the noise tones form outputs A and B is determined by the loading requirements of the transmit amplifiers 1210, 1228

Figure 14:
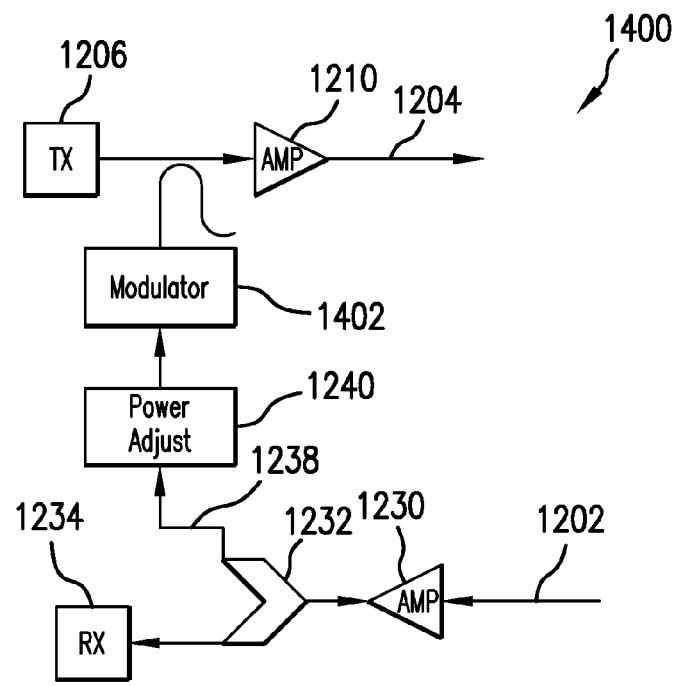
FIG. 14 is a schematic illustration of an another alternative receiver and loop back path configuration consistent with the present invention.

FIG. 14 illustrates another exemplary embodiment 1400 of a system consistent with the invention. In the illustrated exemplary embodiment, one or more modulating devices 1402 may be placed in the noise loading loop back path 1238. The modulating device 1402 may operate to diminish the number of roundtrips possible for the looped noise so that the same noise does not circulate indefinitely through the two noise loading loop back paths and the transmission paths. In one embodiment, the modulating device 1402 may be a frequency shifting device such as an acoustic-optical modulator (AOM).

In another embodiment, the modulating device 1402 may be configured as on/off modulator, a variety of configurations for which will be known to those of ordinary skill in the art. Any system instability may be suppressed by on/off modulating the noise tones (e.g. optical interleaving filter 1232 noise output) with a frequency higher than the inverse of the relaxation time of the amplifiers (e.g. repeaters 110) in the optical transmission path. Thus, a quasi-continuous wave noise loading is applied to the unutilized channels, but instability is interrupted. Due to the looped nature of the noise loading, synchronous on/off modulation of the noise tones may be useful. Also, the modulation may be conducted continuously or intermittently.

Figure 15:
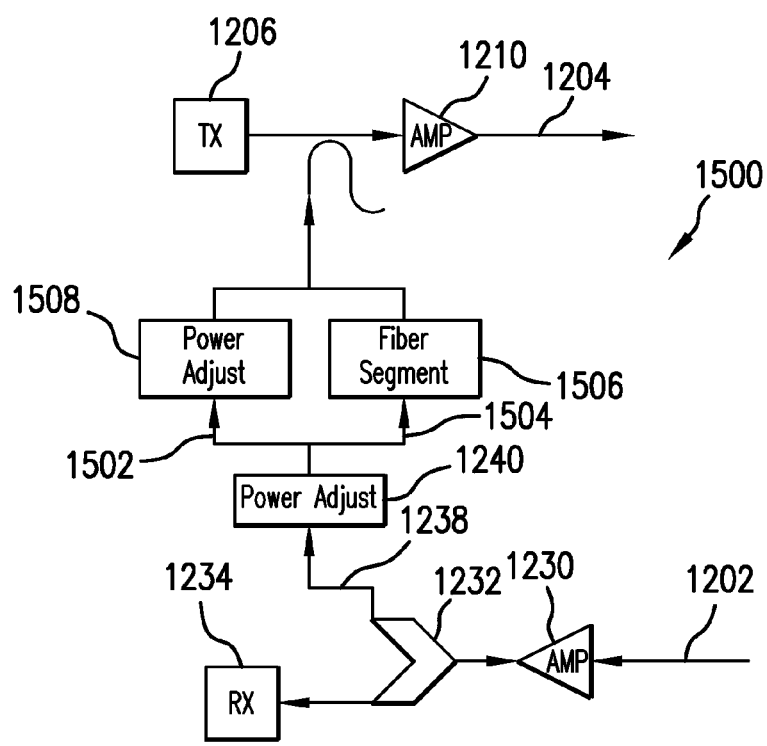
FIG. 15 is a schematic illustration of an another alternative receiver and loop back path configuration consistent with the present invention.

FIG. 15 illustrates another exemplary embodiment 1500 of a system consistent with the invention. In the illustrated embodiment, multi-path interference (MPI) in the noise loading loop back path is implemented to add a time delayed contribution to the noise tones without interfering with data transmission. As shown, the output of the power adjustment device 1240 may be coupled onto two separate paths 1502, 1504. A first one 1504 of the paths may include fiber segment 1506, e.g. a fiber spool, and a second one 1502 of the paths may include a power adjustment device 1508. The output of the power adjustment device 1508 may be combined with the signal emanating from the fiber segment 1506 to establish MPI in the noise loading loop back path 1238.

Figure 16:
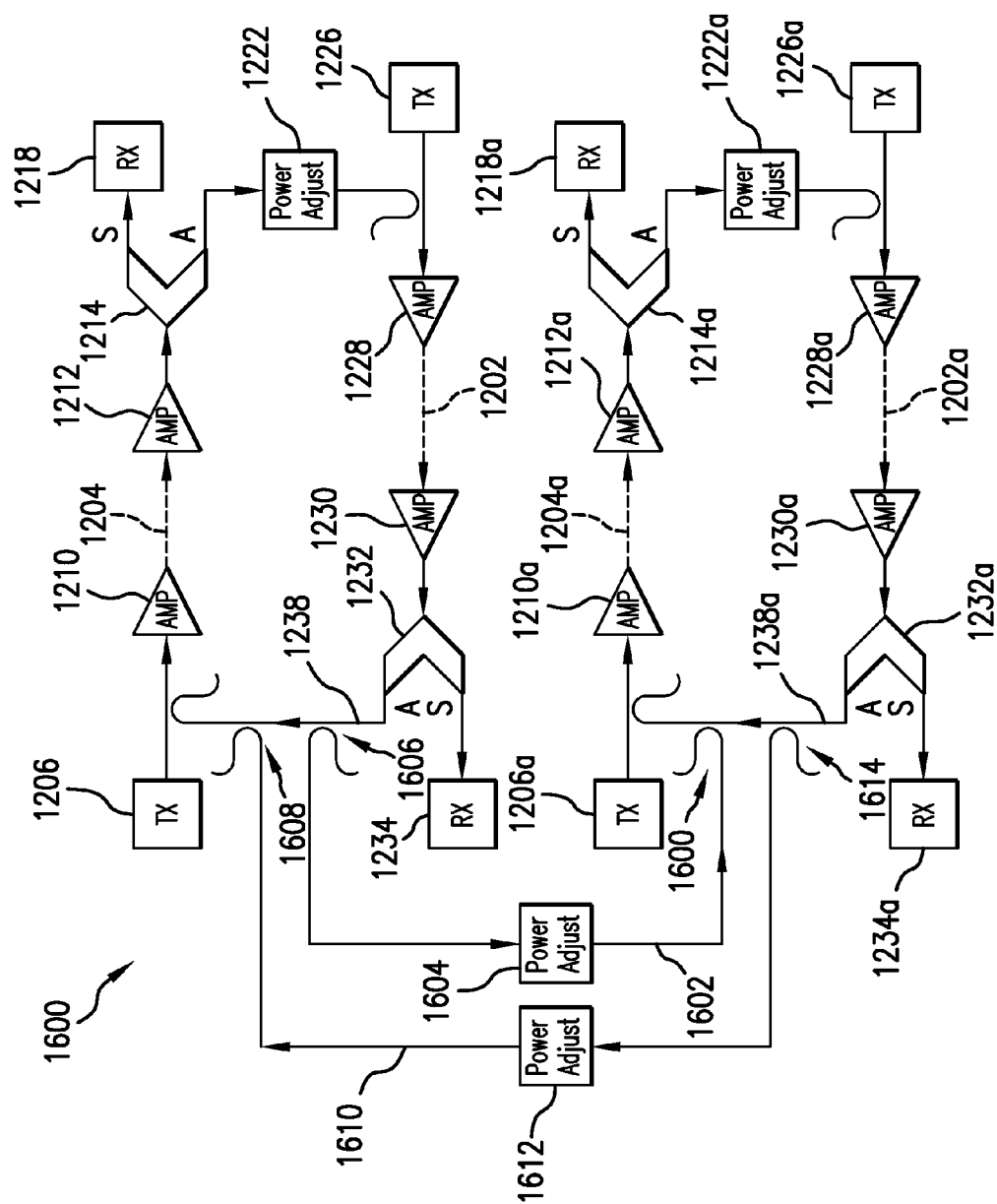
FIG. 16 is a schematic illustration of another exemplary system consistent with the present invention.

FIG. 16 illustrates another exemplary embodiment 1600 of a system consistent with the invention. In the illustrated exemplary embodiment, first and second fiber pairs are configured with noise loading loop back paths as shown. A noise component is added at each round trip of the noise in the respective fiber pairs by first and second noise loading loop back paths extending between the fiber pairs.

In particular, a first noise loading loop back path 1238 may be provided from the receiver path 1202 to the transmitter path 1204, and a second noise loading loop back path 1238a may be provided from the receiver path 1202a to the transmitter path 1204a. A coupler 1606 couples a portion of the noise signal on loop back path 1238 to loop back path 1602, and a coupler 1600 combines the noise on loop back path 1602 with loop back path 1238a. Also, a coupler 1614 couples a portion of the noise signal on loop back path 1238a to loop back path 1610, and a coupler 1608 combines the noise on loop back path 1610 with loop back path 1238. Each of the loop back paths 1238, 1238a, 1602, 1610 may include a power adjustment device 1604, 1612 for adjusting the coupling strength.

The optical interleaving filters 1232, 1232a, 1214, 1214a may essentially be duplicates of each of each other, such that the noise tones at each output A of the optical interleaving filters are essentially at the same locations. Providing noise from paths 1610 and 1602 onto paths 1238, 1238a, respectively, as shown, suppresses instability associated with indefinitely re-circulating noise.

Figure 17:
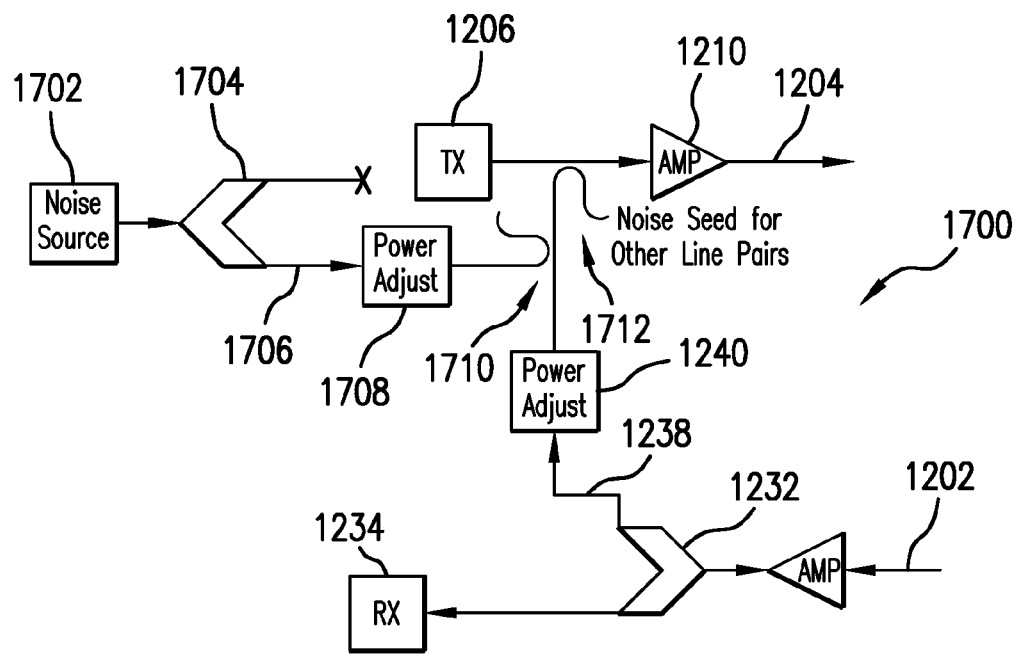
FIG. 17 is a schematic illustration of another exemplary system consistent with the present invention including an exemplary configuration for adding seed noise to a noise loading loop back signal.

FIG. 17 illustrates another exemplary embodiment 1700 of a system consistent with the invention. In the illustrated exemplary embodiment, instability associated with re-circulating noise is suppressed using a noise seed configuration. As shown, the output of a broad band noise source 1702, e.g. an ASE source, it coupled to the input of an optical interleaving filter 1704. Those of ordinary skill in the art will recognize that an optical amplifier, such as an EDFA, may be configured as an ASE source by providing a low input power to the amplifier. Also, any unused fiber pairs in the system, or fiber pairs with enough utilized channels for stable operation, may be used as a broadband noise source.

The optical interleaving filter 1704 may be configured to separate the broadband source at a channel spacing consistent with the channel spacing of the system. An output 1706 of the optical interleaving filter may be coupled to a power adjustment mechanism 1708 for allowing adjustment of the power level in the noise tones output from the optical interleaving filter 1704. The output of the power adjustment mechanism 1708 may be coupled onto the noise loading loop-back path 1238 via a coupler 1710. A separate output port of coupler 1712 may be used as a noise source for other transmission line pairs.

In the illustrated exemplary embodiment, the noise tones circulating in the noise loading loop back paths are partially replaced by the noise tones extracted from the broadband noise source 1702 at each round trip. Sufficient independent noise may thereby be added to the noise loading loop back path 1238 to suppress instability to a tolerable level. When the system is reconfigured to increase the number of utilized channels to a level such that noise loading of unutilized channels is no longer necessary, the broadband noise source 1702 may be decoupled from the noise loading loop back path 1238 completely.

In an alternative embodiment, noise on unutilized bandwidth may be provided by the broadband noise source without noise from the receiver provided on the path 1238. For example, the receiver path 1202 may be disconnected from the loop back path 1238 completely, or the power adjustment device 1240 may be set to an infinite attenuation level. The noise tones and noise seed would thus be derived from the broadband noise source 1702.

Figure 18:
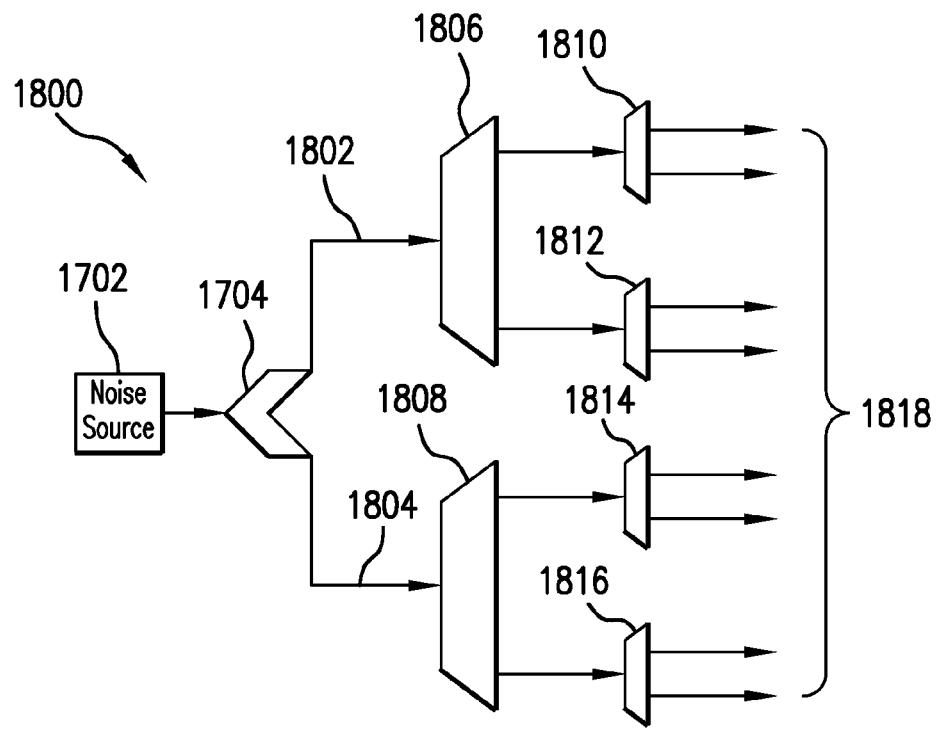
FIG. 18 is a schematic illustration of an exemplary broadband noise source consistent with the invention for adding seed noise to a noise loading loop back signal.

A single broadband noise source 1702 for providing noise seeding as described in connection with FIG. 17, for example, may serve multiple line pairs such that all pairs on a transmission cable are served by a single noise source. FIG. 18 illustrates an exemplary noise source configuration 1800 consistent with the invention. As shown, the output of the broadband noise source 1702 may be coupled to the input of a optical interleaving filter 1704. The optical interleaving filter may be configured to separate the broadband source at a channel spacing consistent with the channel spacing of the system. The optical interleaving filter outputs 1802, 1804 may be coupled to a multi-stage filter configuration. In the illustrated exemplary embodiment, the optical interleaving filter outputs may be respectively coupled to first 1806 and second 1808 first stage filters, and the outputs of each of the first stage filters 1806, 1808 may be coupled to associated second stage filters 1810, 1812 and 1814, 1816, respectively. The second stage filters may thus provide at total of eight outputs 1818 carrying a noise seed for eight fiber pairs of a cable.

Once a system consistent with the present invention is installed, upgrades in the system channel count may be accommodated through modification of the noise loading loop back path(s) to remove noise from the spectral locations of the added channels. In a configuration incorporating one or more optical interleaving filters providing specific noise tones on the noise loading loop back path, for example, when a channel is added at the location of a noise tone the noise loading loop back path may be modified to remove the noise tone at the location of the added channel. One simple approach to upgrading channel count would be to completely remove the noise loading loop back path. Depending on system architecture, however, this can result in a channel power increase, e.g. of about 3 dB, for all system channels. Significant channel power increases can exacerbate difficulties associated with transmission path non-linearities. As such, it may be useful to minimize channel power increases when upgrading system channel counts in a system including a noise loading loop back path.

Figure 19A:
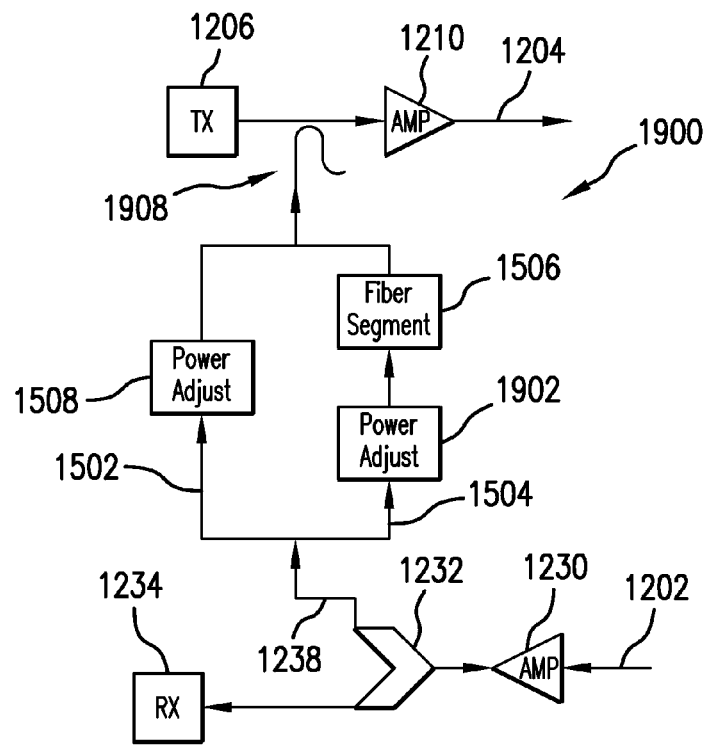
FIGS. 19A-19D are schematics of another exemplary loop back path configuration consistent with the invention and successive modifications thereto for upgrading channel count in an associated WDM system.

FIGS. 19A-19D illustrate an exemplary embodiment of a noise loading loop back in successively modified configurations for upgrading channel count without causing a large channel power increase. FIG. 19A represents an initial configuration of a system including MPI in a noise loading loop back path. The illustrated exemplary embodiment is similar to the embodiment illustrate in FIG. 15, but includes a power adjustment device 1902 in path 1504.

Figure 19B:
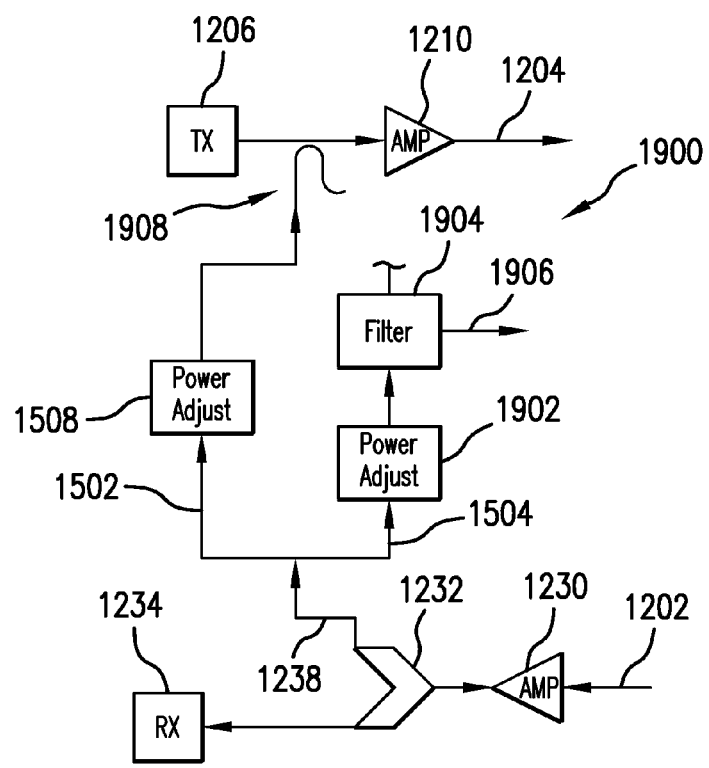

To upgrade channel count in the system 1900, one path 1502 or 1504 may be disconnected from coupler 1908, as shown in FIG. 19B. In the illustrated embodiment, path 1504 is disconnected. This leaves all noise tones from optical interleaving filter 1232 present in the loop back path, i.e. through path 1502 and power adjustment device 1505, and results in a transmitted channel power increase of 1.25 dB in the illustrated embodiment.

In the open path 1504 the fiber segment 1506 may be removed, and one or more filters may be added in the path for dropping noise tones at spectral positions designated for upgrade channels. For clarity and ease of explanation, the illustrated embodiment includes a single three-port filter 1904 configured for dropping an associated noise tone from path 1504 onto path 1906. It is to be understood, however, that any number of filters may be provided, each for dropping one or more noise tones. Also, the filter may take any of a variety of configurations known in the art for dropping one or more selected tones from an optical path.

Figure 19C:
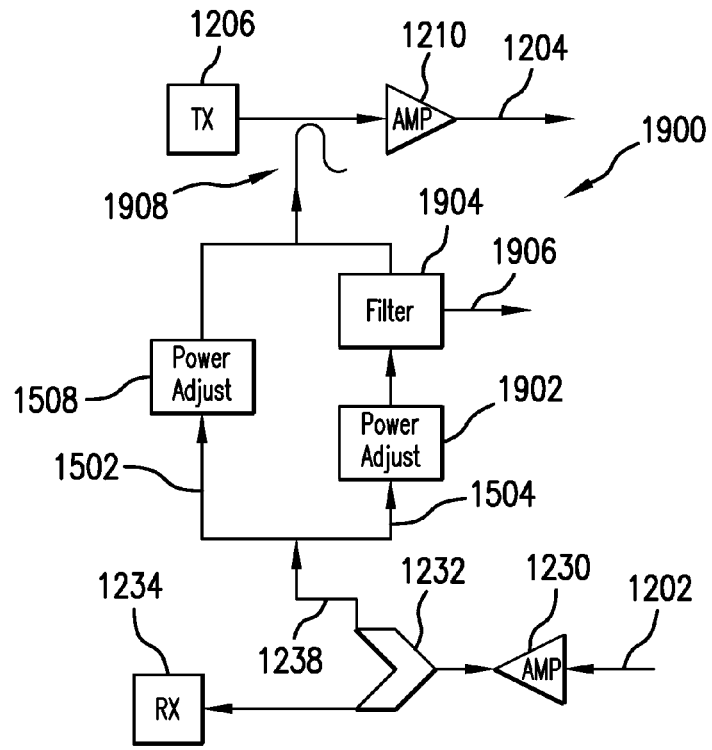
Figure 19D:
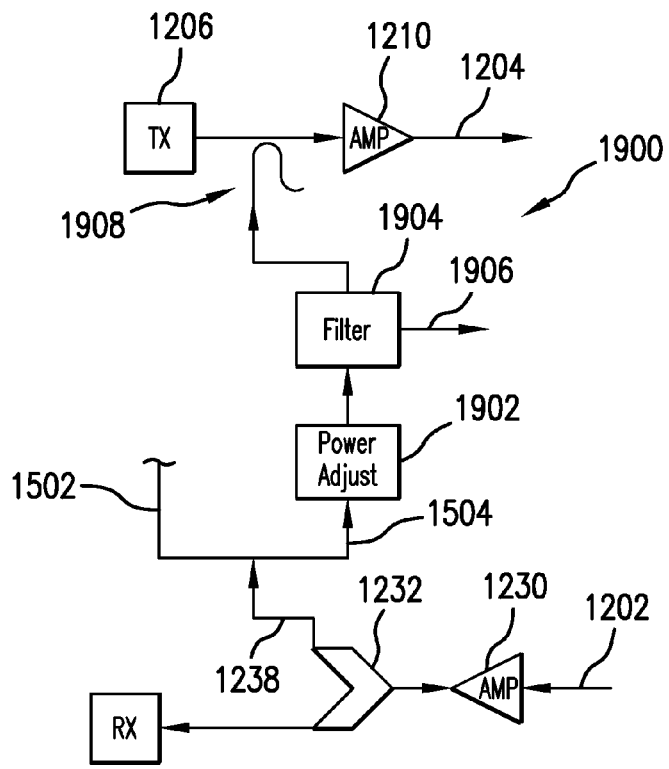

Once the filter 1904 (or filters) is installed, the path may be reconnected to the coupler 1908, as shown in FIG. 19C. The path 1502 may then be disconnected from the coupler 1908 and the power adjustment device 1508 may be removed, as shown in FIG. 19D. By configuring the power adjustment device 1902 such that the insertion loss of the filter 1904 plus the loss of the power adjustment device 1902 are substantially equal to the loss of the power adjustment device 1508 and fiber segment 1506, plus 3 dB, all channel powers in the upgraded system of FIG. 19D may be returned to their original levels.

Subsequent channel upgrades may be accomplished using a similar strategy. In particular, the filters may be added in the open path, i.e. path 1502 in FIG. 19D, to drop noise tones at the designated spectral positions of upgrade channels. The open path may then be reconnected and the previous upgrade path, i.e. path 1504 in FIG. 19D, may be disconnected. Again, the loss imparted by the new upgraded path may be set to ensure that the upgraded channel powers are at the same level as the previous channels.

The embodiments that have been described herein, however, are but some of the several which utilize this invention and are set forth here by way of illustration but not of limitation. Any particular configuration described herein may be combined with one or more other configurations described herein to construct a system consistent with the invention. For example, a configuration including a power adjustment device for reducing input power to a transmit amplifier to generate broadband noise may be combined with a loop back path from a optical interleaving filter to add noise tones. Many other embodiments, which will be readily apparent to those skilled in the art, may be made without departing materially from the spirit and scope of the invention as defined in the appended claims.

What is claimed is:

1. A WDM (wavelength division multiplex) optical system comprising:
   a WDM transmitter configured to provide a WDM signal;
   at least one power adjustment device coupled to said transmitter for attenuating said WDM signal; and
   an optical amplifier coupled to said at least one power adjustment device,
   wherein said WDM signal has a bandwidth comprising least one utilized and at least one unutilized channel of said WDM optical system,
   wherein said WDM transmitter is configured to provide an information signal on each of said utilized channels, and
   wherein said optical amplifier is configured to amplify said attenuated WDM signal to provide an output comprising each said information signal on said utilized channels and noise at said unutilized channels.

2. The system of claim 1, wherein said noise extends across said bandwidth.

3. The system of claim 2, wherein said power adjustment device is configured to attenuate said WDM signal to achieve a desired optical signal-to-noise ratio for said information signals.

4. The system of claim 1, wherein said at least one power adjustment device comprises a variable optical attenuator.

5. The system of claim 1, wherein said optical amplifier comprises an erbium doped fiber amplifier.

6. The system of claim 1, said system further comprising an optically amplified transmission line coupled to said amplifier.

7. The system of claim 1, said system further comprising a transmitting terminal coupled to a receiving terminal through an optically amplified transmission path, and wherein said WDM transmitter, said at least one power adjustment device and said optical amplifier are disposed in said transmitting terminal.

8. The system of claim 7, wherein said optically amplified transmission path comprises a plurality of repeaters and wherein said output is provided to a first repeater of said plurality of repeaters.

9. A WDM (wavelength division multiplex) optical system comprising:
   a WDM transmitter configured to provide a WDM signal, said WDM signal being within a system bandwidth comprising a plurality of information signals on associated utilized channels and a plurality of unutilized channels on which there is no information signal;
   at least one power adjustment device coupled to an output of said transmitter for attenuating said WDM signal;
   an optical amplifier coupled to an output of said at least one power adjustment device for amplifying said WDM signal and imparting amplified spontaneous emission (ASE) noise across said system bandwidth; and
   an optically amplified transmission path coupled to an output of said optical amplifier.

10. The system of claim 9, wherein said power adjustment device is configured to attenuate said WDM signal to achieve a desired optical signal-to-noise ratio for said information signals.

11. The system of claim 9, wherein said at least one power adjustment device comprises a variable optical attenuator.

12. The system of claim 9, wherein said optical amplifier comprises an erbium doped fiber amplifier.

13. The system of claim 9, said system further comprising a transmitting terminal coupled to a receiving terminal through said optically amplified transmission path, and wherein said WDM transmitter, said at least one power adjustment device and said optical amplifier are disposed in said transmitting terminal.

14. The system of claim 13, wherein said optically amplified transmission path comprises a plurality of repeaters and wherein said output is provided to a first repeater of said plurality of repeaters.

* * * * *